Oct. 15, 1929.  W. W. MOHR  1,731,314

VALVE OPERATING MECHANISM

Filed May 23, 1928

INVENTOR
WALTER W. MOHR

BY Albert C. Bill
ATTORNEY

Patented Oct. 15, 1929

1,731,314

UNITED STATES PATENT OFFICE

WALTER W. MOHR, OF CHICAGO, ILLINOIS, ASSIGNOR TO THE EDWARD VALVE AND MANUFACTURING COMPANY, OF EAST CHICAGO, INDIANA, A CORPORATION OF ILLINOIS

VALVE-OPERATING MECHANISM

Application filed May 23, 1928. Serial No. 279,941.

My invention relates to an improved hand mechanism for operating valves of large size so that the valve may be more positively and tightly closed than with hand operating mechanisms of the kind ordinarily employed. My invention relates particularly to the operating mechanisms of valves from 8" to 14" in size and larger although it is applicable to valves of any size where it is desirable to operate them by hand wheels and where the size of the valve makes it difficult to positively close the valve. My invention is also useful with valves of the kind referred to, to positively move the valve proper in whatever position it may be, if the mechanism of the valve or the operating mechanism tends to stick or bind, for example when the valve is completely opened and the operating mechanism is wedged in a manner to make it difficult to start the closing movement of the valve.

Valves of the kind under consideration are of two general types as far as the operating mechanism is concerned, first, valves in which a rotary threaded stem extends from the yoke of the valve, by the turning of which the valve proper is moved towards and from its seat and second, valves having rotary yoke bushings in threaded engagement with threaded stems which are restrained from rotary movement and are capable of moving only axially to move the valve proper to its open and closed position. My present invention is equally applicable to both of these types of valves as will appear below.

Valves of the kind under consideration are of various types as far as the valve proper is concerned namely gate valves, disk valves and cocks having tapered plug valve members, and since my present invention may be used with any type of valve member employed, as long as said valve member is operable by rotary movement of the operating member, the showing of the present application is restricted to the operating mechanism itself and no particular type of valve member is illustrated, it being understood that the operating member may be employed to operate a valve member of any particular type desired in the complete valve construction, which valve member, its seat and its housing may be of any well-known construction.

Figure 1:
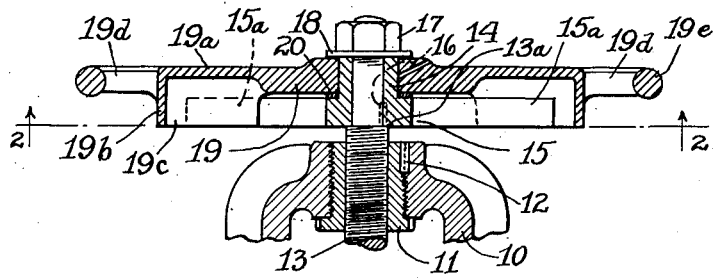
Figure 2:
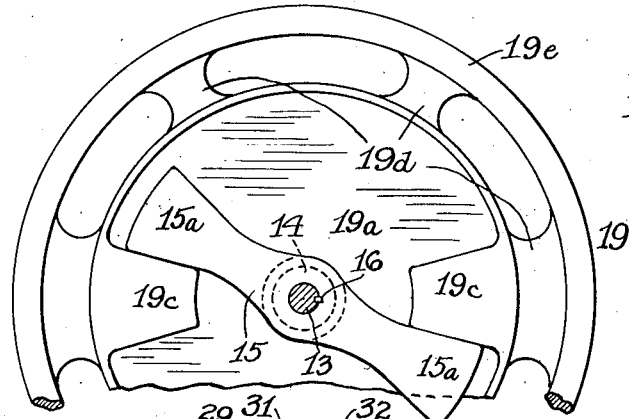
Figure 3:
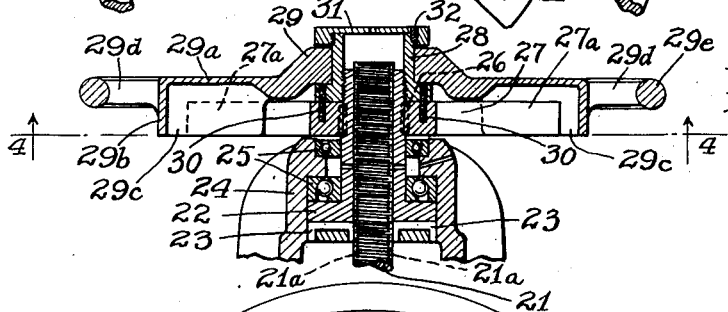
Figure 4:
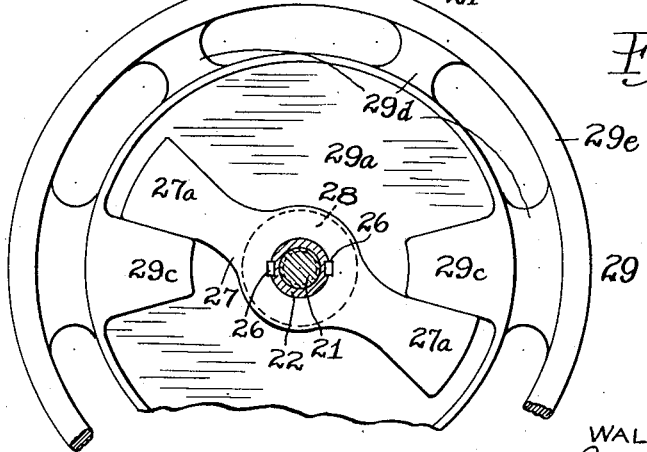

My invention will best be understood by reference to the accompanying drawings showing a preferred embodiment thereof in which Fig. 1 illustrates in vertical sectional view my improved operating mechanism applied to a valve stem having both rotary and longitudinal movement, Fig. 2 is a bottom view of the operating mechanism shown in Fig. 1 taken along the line 2—2 in Fig. 1, Fig. 3 shows in a view similar to Fig. 1 my improved operating mechanism applied to a valve stem having longitudinal movement only, and Fig. 4 is a bottom view of the operating mechanism shown in Fig. 3 taken along the line 4—4 in Fig. 3.

Similar numerals refer to similar parts throughout the several views.

As shown in Figs. 1 and 2, the upper portion of a valve yoke is shown at 10, in which a yoke bushing 11 is threaded and secured in place by a pin 12. The bushing 11 is internally threaded to engage the external threads on a threaded valve stem 13, which extends upwardly beyond the bushing 11 to receive the operating mechanism. Outside of the bushing 11, the valve stem 13 is shouldered as indicated at 13ª to receive the hub portion 14 of the operating member 15, which operating member comprises two oppositely extending arms 15ª, 15ª. The hub 14 is rigidly secured to the outer end of the stem 13 and prevented from turning thereon in any suitable manner, for example by a key 16, and the parts are positively held in the position indicated, by a nut 17 threaded on the end of the stem 13 projecting beyond the hub 14. A retaining washer 18 is located between the outer end of the hub 14 and the nut 17 to retain on the outer cylindrical surface of the hub 14, a hand wheel 19 provided with a bore to turn freely on the hub 14 and of a thickness to substantially fill the space between the washer 18 and a bearing ring 20 on a shouldered portion of the hub 14. The hand wheel 19 consists preferably of an imperforate disk portion 19ª terminating in a depending flange 19ᵇ having a somewhat greater internal radial dimension than the radial length of the arms 15ª, 15ª. At diametrically opposite points, the disk portion 19ª carries lugs 19ᶜ, 19ᶜ extending between the disk portion 19ª and the flange 19ᵇ and lying in the path of the arms 15ª, 15ª, so that the wheel 19 may freely make nearly a half rotation in either direction without engagement between the arms and lugs. The wheel 19 is extended radially beyond the flange 19ᵇ by arms 19ᵈ carrying at their outer ends a hand ring 19ᵉ for engagement by the operator.

The operating member 15 and the wheel 19 are preferably made of cast iron or steel, but other metals or materials may be used, as desired, to meet the requirements of any particular case, to withstand the impacts to which the device is subjected in operation.

From the construction described, it will appear that when it is desired to move the valve stem outwardly to open the valve, the wheel 19 is turned in the direction required by the direction of the threads on the stem 13, which movement may at first turn the hand wheel 19 on the hub 14 until the ends of the arms 15ª, 15ª engage the lugs 19ᶜ, 19ᶜ, after which continued rotation of the wheel 19 rotates the operating member 15 and turns the stem 13 to open the valve. To close the valve, the wheel 19 is rotated in the opposite direction and through the cooperation of the lugs 19ᶜ, 19ᶜ and the arms 15ª, 15ª, the stem 13 is moved inwardly in the yoke bushing 11 to close the valve. In the event the turning of the wheel 19 in the manner described does not succeed in tightly closing the valve, the wheel is rotated in the reverse direction until the clearance between the lugs 19ᶜ, 19ᶜ and the arms 15ª, 15ª is substantial, which may be nearly a one half turn of the wheel 19, and the wheel is then rotated rapidly in the direction required to close the valve. As a result, before the lugs 19ᶜ, 19ᶜ engage the arms 15ª, 15ª, considerable inertia is developed due to the mass of the wheel 19, and this inertia is effective by impact of the lugs 19ᶜ, 19ᶜ upon the arms 15ª, 15ª to further turn the stem 13 assuming that such further turning of the stem is possible, and in this way, by repeated impacts if necessary, the valve may be tightly closed. Similarly, if for any reason in the closed or any other condition of the valve, the operating parts are stuck and it is difficult or impossible to start the moving parts by slow turning movement of the wheel 19, impacts may be imparted to the arms 15ª, 15ª to free the moving parts.

In the construction shown in Figs. 3 and 4, the valve stem 21 is engaged by a yoke sleeve 22 which is internally threaded to engage the external threads on the stem 21. The stem 21 is provided with opposite keyways 21ª engaged by keys 23 carried by the yoke 24, to prevent rotation of the stem 21 and at the same time permit longitudinal movement thereof to operate the valve member with which the stem may be connected. The yoke sleeve 22 is shown as provided with ball bearings 25 between it and the yoke 24, which bearings are preferably of a type to take both radial and longitudinal thrusts, so that the turning friction of the sleeve 22 may be a minimum at all times. The sleeve 22 is extended beyond the yoke as indicated and has keyed to it at 26, an operating member 27 similar to the operating member 15 and similarly provided with opposite arms 27ª, 27ª. The sleeve 22 extends beyond the member 27 and its extension is externally threaded to engage internal threads in a sleeve 28 which is provided with an external cylindrical surface and shouldered at its lower end to form a bearing support for a hand wheel 29. When the sleeves 28 is tightly screwed on the end of the sleeve 22, it is held in place by suitable means, for example screws 30 as indicated. A cap 31 is screwed on the outer end of the sleeve 28 to hold the hand wheel 29 in place, the proportions of the parts being such as to permit free turning movement of the wheel 29 on the sleeve 28. A locking screw 32 engages the cap 31 and the sleeve 28 to hold the cap in place.

The wheel 29 is provided with an imperforate disk portion 29ª, a flange portion 29ᵇ and lugs 29ᶜ, also with arms 29ᵈ and a hand ring 29ᵉ for engagement by the operator, in substantially the manner above described for the wheel 19, so that the wheel 29 may be used in the same manner above described, to turn the operating member 27, either by slow turning movement, or by impact, as conditions may dictate. The turning of the operating member 27, as a result of the construction described, turns the yoke sleeve 22, and this in turn imparts longitudinal movement in one direction or the other to the valve stem 21, and any impacts produced between the arms 27ª, 27ª and the lugs 29ᶜ, 29ᶜ serve to positively move the valve stem 21 in one direction or the other. The operating member 27 and the wheel 29 are preferably made of the same material and for the same reasons, as the operating member 15 and the wheel 19 above described.

While I have shown my invention in the particular embodiment above described, it will be understood that I do not limit myself to this exact construction as I may employ equivalents known to the art at the time of the filing of this application without departing from the scope of the appended claims.

What I claim is:

1. In a valve operating mechanism, the combination of a valve stem movable longitudinally, a rotary member for moving said valve stem, and a hand wheel freely rotatable to a limited extent relatively to said member and said stem, said member and said wheel having portions engaging each other to restrict rotation of said wheel relatively to said member to said limited amount, whereby the inertia of said wheel due to said limited rotation may be expended by impact on said member to move it, said wheel having an imperforate disk and flange construction covering said member and said engaging portions.

2. In a valve operating mechanism, the combination of a valve stem movable longitudinally, a rotary member for moving said valve stem, and a hand wheel freely rotatable to a limited extent relatively to said member and said stem, said member and said wheel having portions engaging each other to restrict rotation of said wheel relatively to said member to said limited amount, whereby the inertia of said wheel due to said limited rotation may be expended by impact on said member to move it, said wheel having an imperforate disk and flange construction covering said member and said engaging portions, arms extending from said covering construction, and a hand ring carried by said arms.

3. In a valve operating mechanism, the combination of a valve stem movable longitudinally, a rotary member for moving said valve stem, and a hand wheel freely rotatable to a limited extent relatively to said member and said stem, said member having two opposed radial arms, and said wheel comprising a disk and flange construction covering said arms, and lugs in the paths of the outer ends of said arms.

4. In a valve operating mechanism, the combination of a threaded valve stem, a yoke bushing internally threaded and engaging the threads on said stem, a member rotary about the axis of said stem to produce relative rotation between said stem and bushing to move said stem longitudinally, and a hand wheel rotary about the axis of said stem and free to rotate to a limited extent relatively to said member, said wheel and said member having cooperating portions restricting rotation of said wheel relatively to said member to said limiting amount, said wheel having an imperforate disk and flange construction covering said member and said cooperating portions.

5. In a valve operating mechanism, the combination of a threaded valve stem, a yoke bushing internally threaded and engaging the threads on said stem, a member rotary about the axis of said stem to produce relative rotation between said stem and bushing to move said stem longitudinally, and a hand wheel rotary about the axis of said stem and free to rotate to a limited extent relatively to said member, said wheel and said member having cooperating portions restricting rotation of said wheel relatively to said member to said limiting amount, said wheel having an imperforate disk and flange construction covering said member and said cooperating portions, arms extending from said covering construction, and a hand ring carried by said arms.

6. In a valve operating mechanism, the combination of a threaded valve stem, a yoke bushing internally threaded and engaging the threads on said stem, a member rotary about the axis of said stem to produce relative rotation between said stem and bushing to move said stem longitudinally, and a hand wheel rotary about the axis of said stem and free to rotate to a limited extent relatively to said member, said member having two opposed radial arms, and said wheel comprising a disk and flange construction covering said arms, and lugs in the paths of the outer ends of said arms.

7. In a valve operating mechanism, the combination of a threaded valve stem, a yoke bushing internally threaded and engaging the threads on said stem, a member rotary about the axis of said stem to produce relative rotation between said stem and bushing to move said stem longitudinally, and a hand wheel rotary about the axis of said stem and free to rotate to a limited extent relatively to said member, said member having two opposed radial arms, and said wheel comprising a disk and flange construction covering said arms, lugs in the paths of the outer ends of said arms, arms extending from said covering construction, and a hand ring carried by said latter arms.

8. In a valve operating mechanism, the combination of a threaded valve stem, a fixed internally threaded yoke bushing engaging the threads on said stem, an operating member secured to the end of said stem, and a hand wheel rotatable on said stem, said member having two opposed radial arms, and said wheel comprising a disk and flange construction covering said arms, and lugs in the paths of the outer ends of said arms.

9. In a valve operating mechanism, the combination of a threaded valve stem, a fixed internally threaded yoke bushing engaging the threads on said stem, an operating member secured to the end of said stem, and a hand wheel rotatable on said stem, said member having two opposed radial arms, and said wheel comprising a disk and flange construction covering said arms, lugs in the paths of the outer ends of said arms, arms extending from said covering construction, and a hand ring carried by said latter arms.

In witness whereof, I hereunto subscribe my name this 10th day of May, A. D. 1928.

WALTER W. MOHR.